US010203025B2

(12) United States Patent
Lindstrom et al.

(10) Patent No.: US 10,203,025 B2
(45) Date of Patent: Feb. 12, 2019

(54) BELT TENSIONER WITH SUPPLEMENTAL FORCE ELEMENT

(71) Applicants: James Kevin Lindstrom, Springdale, AR (US); Kevin Gerard Dutil, Bentonville, AR (US); Anthony E. Lannutti, Fayetteville, AR (US); Chester E. Duffield, III, Roger, AR (US); Robert J. Crist, Bentonville, AR (US)

(72) Inventors: James Kevin Lindstrom, Springdale, AR (US); Kevin Gerard Dutil, Bentonville, AR (US); Anthony E. Lannutti, Fayetteville, AR (US); Chester E. Duffield, III, Roger, AR (US); Robert J. Crist, Bentonville, AR (US)

(73) Assignee: Dayco IP Holdings, LLC, Troy, MI (US)

(*) Notice: Subject to any disclaimer, the term of this patent is extended or adjusted under 35 U.S.C. 154(b) by 125 days.

(21) Appl. No.: 14/193,389

(22) Filed: Feb. 28, 2014

(65) Prior Publication Data
US 2015/0247557 A1  Sep. 3, 2015

(51) Int. Cl.
*F16H 7/12* (2006.01)
*F16H 7/08* (2006.01)

(52) U.S. Cl.
CPC .............. *F16H 7/12* (2013.01); *F16H 7/1218* (2013.01); *F16H 2007/0802* (2013.01); *F16H 2007/0893* (2013.01); *Y10T 29/49826* (2015.01)

(58) Field of Classification Search
CPC .............. F16H 2007/081; F16H 7/1218; F16H 2007/084; F16H 7/1281; F16H 2007/0846
(Continued)

(56) References Cited

U.S. PATENT DOCUMENTS 4,596,538 A * 6/1986 Henderson ............ F16H 7/1218
474/117
4,832,666 A   5/1989 Henderson
(Continued)

FOREIGN PATENT DOCUMENTS

EP   0866240 A1   9/1998
GB   2263150      7/1993

OTHER PUBLICATIONS

PCT, International Search Report and Written Opinion, International Patent Application No. PCT/US2015/017229 (dated May 27, 2015).
(Continued)

*Primary Examiner* — Henry Y Liu
(74) *Attorney, Agent, or Firm* — FisherBroyles, LLP; Susan M. Oiler (57) ABSTRACT

Zed-type belt tensioners are described that include an arm having a first end rotatable about a first axis to move a second end of the arm into engagement with a belt, a tensioner component coupled to the first end of the arm, and a supplemental force element positioned between the arm and the tensioner component. The second end of the arm while tensioning a belt experiences a hub load applied by the belt and the supplemental force element is positioned at a point to apply a force that counteracts the hub load thereby reducing cocking of the arm. Also described herein are methods of counteracting the hub load using such belt tensioners and methods of assembly of such belt tensioners.

8 Claims, 7 Drawing Sheets

(58) Field of Classification Search
USPC .......................................................... 474/135
See application file for complete search history.

(56) References Cited

U.S. PATENT DOCUMENTS

| | | | | |
|---|---|---|---|---|
| 4,886,483 A | * | 12/1989 | Henderson | F16H 7/1218 474/135 |
| 4,906,222 A | * | 3/1990 | Henderson | F16H 7/1218 474/135 |
| 4,971,589 A | * | 11/1990 | Sidwell | F16H 7/1218 474/117 |
| 4,985,010 A | | 1/1991 | Henderson | |
| 5,015,217 A | | 5/1991 | Henderson | |
| 5,030,171 A | * | 7/1991 | Henderson | F16H 7/1218 474/135 |
| 5,057,059 A | * | 10/1991 | Sidwell | F16H 7/1218 474/135 |
| 5,149,306 A | * | 9/1992 | Sidwell | F16H 7/1218 474/117 |
| 5,250,009 A | * | 10/1993 | Sidwell | F16H 7/1218 474/117 |
| 5,334,109 A | * | 8/1994 | Izutsu | F16H 7/1218 474/135 |
| 5,370,586 A | | 12/1994 | Thomsen et al. | |
| 5,405,297 A | * | 4/1995 | Gardner | F16H 7/1281 474/135 |
| 5,545,095 A | * | 8/1996 | Henderson | F16H 7/1218 474/135 |
| 5,575,727 A | * | 11/1996 | Gardner | F16H 7/1281 474/135 |
| 5,803,849 A | | 9/1998 | Ayukawa | |
| 5,964,674 A | | 10/1999 | Serkh et al. | |
| 6,565,468 B2 | * | 5/2003 | Serkh | F16H 7/1218 474/135 |
| 7,371,199 B2 | * | 5/2008 | Joslyn | F16H 7/1218 474/135 |
| 7,448,974 B2 | * | 11/2008 | Crist | F16H 7/1218 474/133 |
| 7,497,794 B2 | * | 3/2009 | Lannutti | F16H 7/1218 474/133 |
| 7,887,445 B2 | * | 2/2011 | Quintus | F16H 7/1218 474/109 |
| 8,123,640 B2 | * | 2/2012 | Quintus | F16H 7/1218 474/135 |
| 8,403,785 B2 | * | 3/2013 | Lannutti | F16H 7/1218 474/135 |
| 2003/0153422 A1 | * | 8/2003 | Quintus | F02B 67/06 474/135 |
| 2005/0059518 A1 | * | 3/2005 | Joslyn | F16H 7/1218 474/135 |
| 2006/0172837 A1 | * | 8/2006 | Quintus | F16H 7/1218 474/135 |
| 2008/0058140 A1 | * | 3/2008 | Gerring | F16H 7/1236 474/133 |
| 2011/0152023 A1 | * | 6/2011 | Quintus | F16H 7/1218 474/135 |
| 2013/0085027 A1 | * | 4/2013 | Meckstroth | F16H 7/1218 474/135 |
| 2013/0217525 A1 | * | 8/2013 | Crist | F16H 7/1281 474/111 |

OTHER PUBLICATIONS

Dayco high offset, flat wire tensioner (at least as early as May 6, 2013).
CN, First Office Action with English Translation; Chinese Application No. 201580010114.7 (dated Feb. 24, 2018).
CN, Search Report with English Translation; Chinese Application No. 201580010114.7 (dated Feb. 24, 2018).
CN, Second Office Action; Chinese Application No. 2015800101147 (dated Aug. 15, 2018).
CN, Second Office Action Search Report; Chinese Application No. 2015800101147 (dated Aug. 15, 2018).
EP, Supplemental Search Report; European Application No. 15755435.3 (dated Nov. 20, 2017).
EP, First Office Action, European Application No. 15755435.3 (dated Jul. 3, 2018).
EP, Second Office Action; European Application No. 15755435.3 (dated Dec. 14, 2018).

* cited by examiner

BELT TENSIONER WITH SUPPLEMENTAL FORCE ELEMENT

TECHNICAL FIELD

The present application relates generally to Zed-type belt tensioners and more particularly to a Zed-type belt tensioner having a supplemental force element included therein to apply a supplemental force to counteract a hub load experience by the belt tensioner during belt tensioning.

BACKGROUND

It is known to drive various automobile accessory assemblies, for example, the water pump, the generator, the fan for cooling the coolant, the power steering pump, and the compressor, by the vehicle engine. This is done by a driving pulley actuated by the engine shaft of the motor vehicle which drives an endless drive belt operating the accessory assemblies through driven pulleys.

The tensioner arms in many accessory assemblies sustain large hub loads applied to them that may adversely affect tensioner arm alignment. This is especially true for front end accessory drives that utilize "high offset" or Zed-type belt tensioner designs. The hub load in Zed-type belt tensioner can be strong enough to tilt or cock the arm off of its contact surfaces when the hub load is larger than can be countered by the main tensioner spring. Consequently, the tilting or cocking of the arm causes uneven wear (and therefore shorter useful life) of components within the tensioner that contact the arm in its tiled or cocked position, e.g., a bushing on which the arm rotates.

SUMMARY

In one aspect, a Zed-type belt tensioner is disclosed, the belt tensioner including an arm having a first end and a second end. The first end is rotatable about a first axis to move the second end into engagement with a belt. The second end experiences a hub load during engagement with the belt. The tensioner further includes a tensioner component coupled to the first end of the arm and a supplemental force element positioned between the arm and the tensioner component. The supplemental force element applies a force that counteracts the hub load, thereby reducing cocking of the arm.

In accordance with another aspect, a method of counteracting hub load forces in a Zed-type belt tensioner is disclosed. The method includes providing a tensioner, where the tensioner includes an arm having a first end and a second end. The first end is rotatable about a first axis to move the second end into engagement with a belt. The second end experiences a hub load during engagement with the belt. The tensioner further includes a tensioner component coupled to the first end of the arm and a supplemental force element positioned between the arm and the tensioner component. The supplemental force element applies a force that counteracts the hub load, thereby reducing cocking of the arm. The method further includes applying the hub load and applying, via the supplemental force element, a supplemental force that counteracts the hub load.

In yet another aspect, a method of assembling a Zed-type belt tensioner is disclosed. The method includes providing an arm having a first end and a second end. The first end is rotatable about the first axis to move the second end into engagement with a belt, and the second end experiences a hub load during engagement with the belt. The method further includes coupling a tensioner component to the arm with a supplemental force element positioned between the tensioner component and the arm at a point where the force applied by the supplemental force element when the arm experiences a hub load counteracts the hub load, thereby reducing cocking of the arm.

Other aspects of the disclosed structure and method will become apparent from the following description, the accompanying drawings, and the appended claims.

DETAILED DESCRIPTION

The following detailed description will illustrate the general principles of the invention, examples of which are additionally illustrated in the accompanying drawings. In the drawings, like reference numbers indicate identical or functionally similar elements. Relative terms such as above, below, downward, upward, and the like are used for convenience with respect to the orientation of features depicted in the drawings to describe the relative positioning of various features in relationship to each other, and such terms should not be interpreted as limiting the invention to the depicted orientations.

Figure 1:
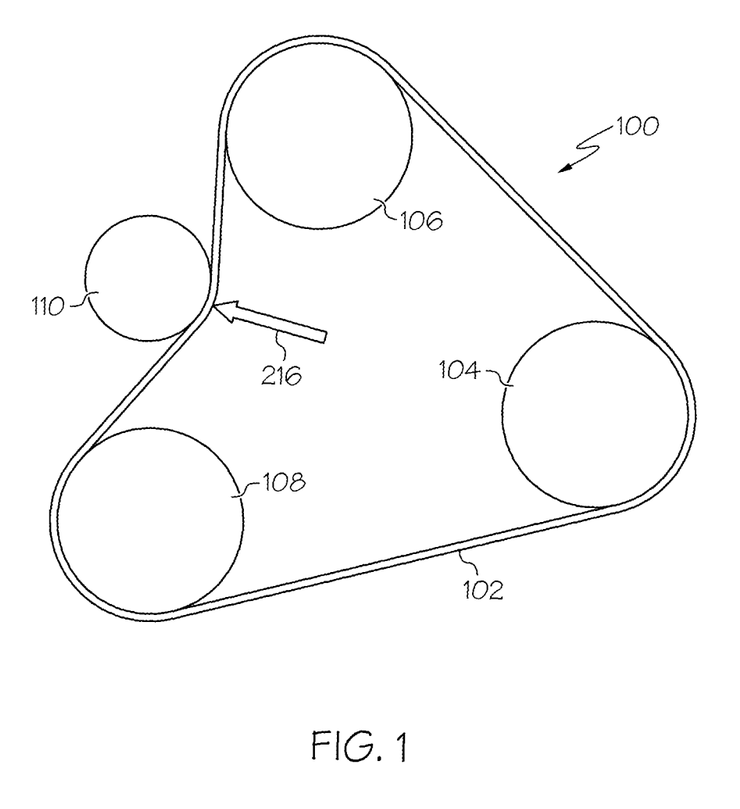
FIG. 1 is a schematic elevation illustrating a vehicle belt routing diagram.

FIG. 1 is a schematic illustration of a belt drive system, generally designated 100. The belt drive system as shown includes a belt 102, a front-side driver pulley 108, one or more accessory pulleys 104,106, and one or more tensioners 110. The belt drive system 100 depicted in FIG. 1 is only one example of a drive system configuration. Many alternate arrangements are known in the art and are suitable for use with the present invention.

The belt tensioner 110 disclosed herein is a "high offset" or Zed-type tensioner that incorporates a supplemental force element 122 to provide a supplemental force that counteracts tilting or cocking of the arm from a hub load applied to the belt tensioner 110 during operation. Typically, the belt 102 acting upon a pulley 128 (FIG. 2) of the belt tensioner 110 is the source of the hub load. Left unchecked, the hub load can cause uneven wear on various components of the belt tensioner 110, which may ultimately shorten the useful life of the belt tensioner 110. However, in the disclosed belt tensioner 110, the supplemental force element 122 exerts a supplemental force opposite the hub load to counteract the hub load. Additionally, the supplemental force furnished by the supplemental force element 122 may provide a supplemental damping effect on the belt tensioner 110, in addition to the primary damping mechanisms provided by other features of the belt tensioner 110.

Figure 3:
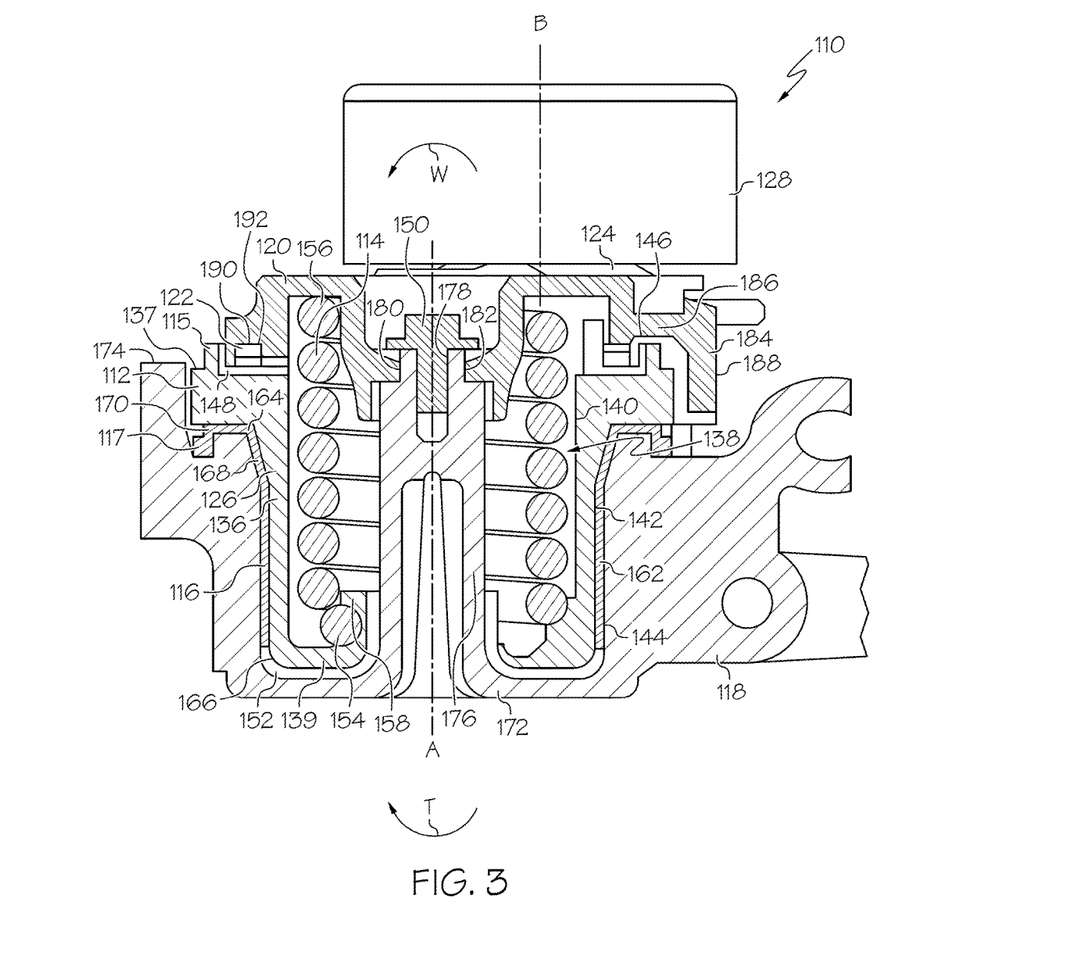
FIG. 3 is a transverse cross-sectional view through the first end of the arm of the tensioner of FIG. 2.

Referring now to FIG. 3, the belt tensioner 110 includes an arm 112 rotatable about a first axis A in the tensioning direction T and in the winding direction W opposite the tensioning direction. The belt tensioner 110 further includes a spring 114 or other primary torsion element, a bushing 116, a support member or spring case 118, a cap 120, a supplemental force element 122, and a supplemental bushing 148. The arm 112 has a second end 124 axially displaced from a first end 126 (i.e. the ends 124, 126 are offset relative to each other), and the arm 112 includes a pulley 128 rotatably mounted to the second end 124 thereof for rotation about a second axis B that is spaced from, offset from, and parallel to the first axis A. The pulley 128 may be coupled to the arm 112 with a bolt 130 and nut 132 or other fastener and may include a dust cover 134.

The arm 112 includes, at its first end 126, an arm arbor 136 extending from the arm 112 about the first axis A. The arm arbor 136 may be generally cylindrical. The body of the arm arbor 136 may define an inner surface 140, an outer surface 142, and opposing ends 137, 139. The inner surface 140 of the arm arbor 136 may define a housing 138 that may receive the spring 114, and the bushing 116 may be disposed between the outer surface 142 of the arm arbor 136 and the inner surface 144 of the support member 118. A seal 117, for example a V-ring seal, may also be positioned between the arm 112 and the support member 118 to protect the belt tensioner 110 from contaminants.

In one embodiment, the supplemental force element 122 is received in the supplemental bushing 148. The supplemental bushing 148 is positioned between the end 137 of the arm arbor 136 and an inner surface 146 of the cap 120. The arm 112 includes a lip 115 projecting outwardly from a surface 13, where the lip 115 receives a first end 194 of the supplemental bushing 148. Upon assembly, the cap 120 and the support member 118 may enclose the other components of the belt tensioner 110, for example the spring 114, the arm arbor 136, the bushing 116, the supplemental bushing 148, and the supplemental force element 122, and protect these and other components from contaminants. The assembly may further include a bolt 150 to increase the strength of a radially riveted joint between a pivot shaft 176 of the support member 118 and the cap 120 to support axial forces applied by the spring 114 and/or the supplemental force element 122.

The spring 114 is seated within the housing 138 of the arm arbor 136, which in turn is disposed within a cavity 152 defined by the support member 118. The spring 114 has a first end 154 coupling the spring 114 to the arm 112, in particular to the arm arbor 136, and a second end 156 coupling the spring 114 to the cap 120. As shown in FIG. 3, the first end 154 of the spring 114 abuts against or is received in a first abutment feature 158 of the arm 112 to couple the tensioner arm 112 to the spring 114, and the second end 145 abuts or is received in a second abutment feature 160 of the cap 120. Thus, when the arm 112 rotates in the winding direction W in response to belt loading or other prevailing forces of the power transmitting element which is tightening in the span where the belt tensioner 110 resides, the spring 114 will unwind, and when the belt loading or other prevailing forces dissipate, the torque built up in the spring 114 as a result of its unwound state urges the tensioner arm 112 to rotate in the tensioning direction T as the spring returns to its wound state. Alternately, the spring 114 may be loaded such that the spring 114 winds more tightly in response to belt loading in the winding direction W and the spring 114 urges the arm 112 in tensioning direction T when the forces dissipate by unwinding to its original state.

Figure 2:
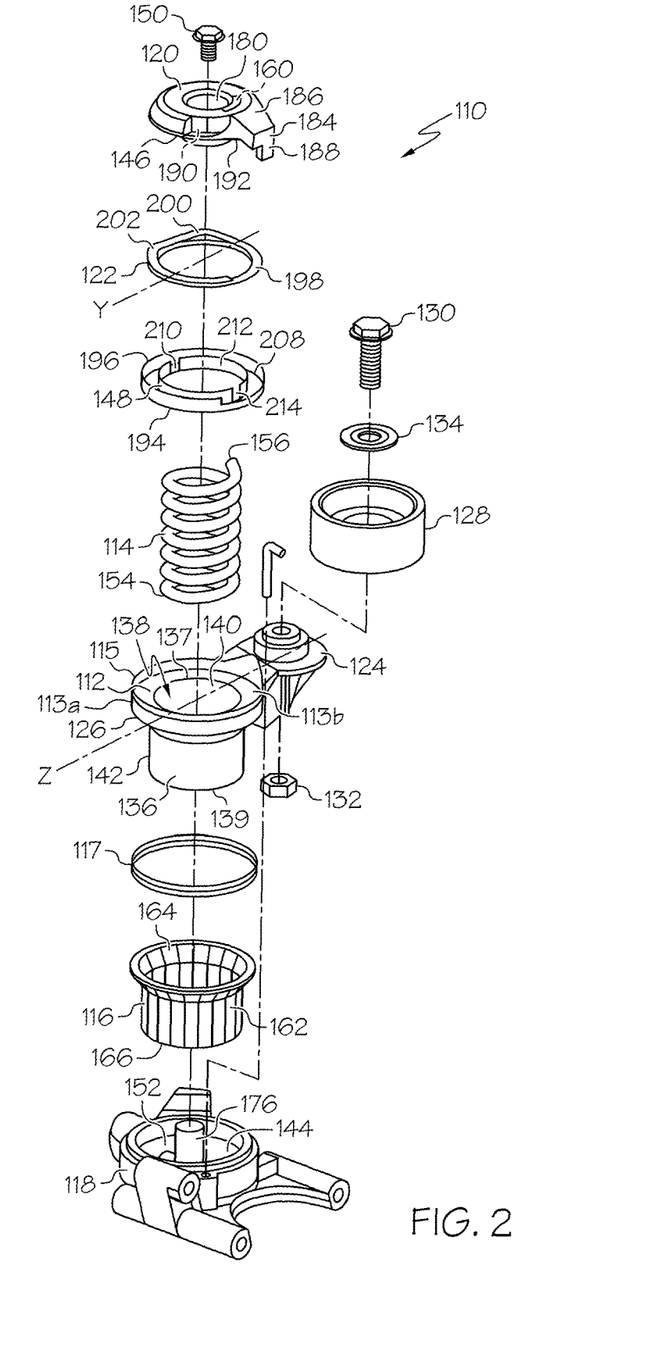
FIG. 2 is an exploded view of one embodiment of a belt tensioner having a supplemental force element.

Referring to both FIGS. 2 and 3, the spring 114 may be a torsional spring of any shape and/or configuration. In one embodiment, the spring 114 is a round-wire spring. In another embodiment, the spring 114 may be a square or rectangular spring or a square or rectangular coil spring. In another embodiment, the torsional spring is a flatwire spring. One of skill in the art will appreciate that these various torsional springs may require alternate spring end engagement points within the tensioner to provide secure attachments so that the spring winds and unwinds appropriately to bias the arm. Further, the spring 114 may be entirely replaced with an alternative tension-supplying component, such as a torsion bar, to provide the requisite biasing forces for the primary functionality of the belt tensioner 110, without departing from the scope of the disclosed tensioner 110.

The bushing 116 may be positioned or positionable between the arm arbor 136 and the inner surface 144 of the support member 118, adjacent to the outer surface 142 of the arm arbor 136. The bushing 116 may include a sleeve 162, where the sleeve defines a first open end 164 and a second open end 166. The bushing 116 may be generally cylindrical or conical, and/or the bushing 116 may further include a conical portion 168 and/or a flange 170 extending from one or both ends 164, 166 of the sleeve 162.

Referring to FIG. 3, the support member 118 has a closed end 172 and an open end 174 and includes the pivot shaft 176 that extends from the closed end 172 into the cavity 152. The pivot shaft 176 is coaxial with axis A such that the arm arbor 136 rotates about the pivot shaft 176 at least partially within the cavity 152. The pivot shaft 176 of the support member 118 may define an axially extending opening 178 or bore to receive the bolt 150.

Still referring to FIG. 3, the cap 120 includes a generally centrally located opening 180 or bore to receive the bolt 150. The opening 180 may be countersunk into an upper surface 182 of the cap 120 to receive the head of the bolt 150. The cap 120 may include one or more tabs 184 extending outward therefrom. The tabs 184 may be generally L-shaped and comprise an arm 186 extending generally horizontally outward from the outer periphery of the cap 120 and a flange 188 generally extending vertically down from the end of the arm 186 opposite the periphery of the cap 120. The second abutment feature 160 located on the underside 192 of the cap 120 may receive the second end 156 of the spring 114. A track 190 may also be recessed into the underside 192 of the cap 120 to receive or seat the supplemental force element 122 and/or a second end 196 of the supplemental bushing 148 therein.

Figure 4:
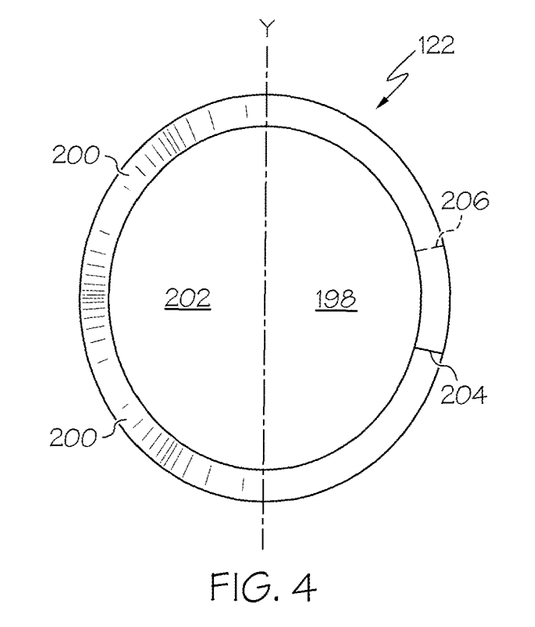
FIG. 4 is a top view of the supplemental force element of the tensioner of FIG. 2.
Figure 5:
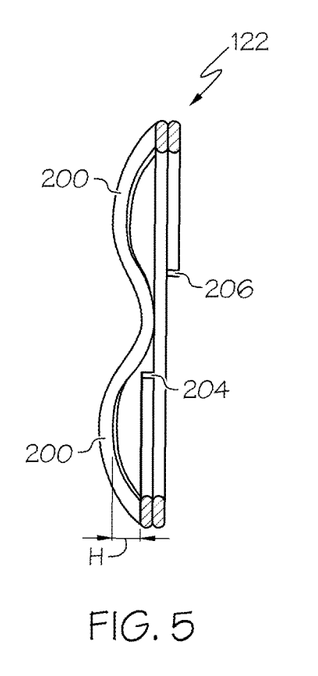
FIG. 5 is a side view of the supplemental force element of FIG. 4.

The supplemental force element 122, in the embodiment shown in FIGS. 2, 4, and 5, is a generally annular ring which is substantially flat (axially) along a flat first half 198 of its circumference and which includes one or more waves 200 along a waved second half 202 of its circumference (see FIG. 4, where dashed line Y generally delineates the halves 198, 202). The halves 198, 202 need not be exact halves in the mathematical sense (though they may be), but rather the term "half" is meant to distinguish two distinct portions of the generally annular ring of the supplemental force element 122. Thus, the supplemental force element 122 is a wave spring that can differentially apply an axial force along the waved second half 202, by resisting compression of the waves 200 toward a flattened state, but which does not apply a significant axial force along the flat first half because there are no waves or other features present to resist axial movement and apply such an axial force.

The supplemental force element 122 is operatively connected to the cap 120 and biased to exert an axial force to urge the first end 126 of the arm 112 to prevent or reduce tilting or cocking of the arm 112 in response to the hub load. The more waves 200 included in supplemental force element 122, the smaller the axial height H necessary, per wave 200, to provide a specific amount of force, thus reducing the space requirements of the supplemental force element 122 to achieve a given force. The supplemental force element 122 may have any number of waves 200, and the heights of the individual waves 200 therein may be uniform or variable, to control the distribution of force to the arm 112 as desired.

In one embodiment, as shown in FIG. 5, the supplemental force element 122 is formed of a continuous coil of wire with a first end 204 and a second end 206 forming a single complete turn, where the ends 204, 206 terminate short of forming a three-layer stack of wire at any given point along the circumference of the supplemental force element 122. The supplemental force element 122 may include additional complete or partial turns. Ends 204, 206 may be keyed to abutment features or other connection mechanisms on the underside 192 of the cap 120, for example within the track 190, and/or within the supplemental bushing 148 to retain the supplemental force element 122 in the proper orientation with respect to the arm 112 and other components within the belt tensioner 110 to avoid rotation of the supplemental force element 122 about axis A (FIG. 3), which would alter the placement of the waved second half 202 of the supplemental force element 122 and misdirect the supplemental force.

Referring again to FIGS. 2 and 3, the supplemental bushing 148 has a first end 194 and a second end 196, where the first end 194 interfaces with the surface 113 of the arm 112 and the second end 196 interfaces with the cap 120. The supplemental bushing 148 has an annular track 208 to receive the supplemental force element 122 therein. The supplemental bushing 148 may further include one or more protrusions or other features (for example, within the track 208) to couple one or both ends 204, 206 of the supplemental force element 122 to the supplemental bushing 148 to non-rotatably couple the supplemental force element 122 to the supplemental bushing 148. The supplemental bushing 148 may have one or more slots 210 or ridges 212 along its second end 196 that correspond with features on the underside 192 of the cap 120 to maintain alignment of the supplemental bushing 148 with the cap 120 and ensure that the supplemental bushing 148 is non-rotatable relative to both the cap 120 and the support member 118. In particular, the outer surface of the second end 196 of the supplemental bushing 148 may have one or more cutouts 214 to accommodate the tabs 184 of the cap 120.

When the components of the belt tensioner 110 described above are assembled for operation, the spring 114 is loaded to bias the arm 112 in the tensioning direction. The cap 120, the supplemental force element 122, the supplemental bushing 148, and the arm 112 are compressed together (for example, by tightening the bolt 150). This loads the waved second half 202 of the supplemental force element 122 by compressing the waves 200 thereon, which imparts a bias along the waved second half 202 toward axial expansion. However, because the flat first half 198 of the supplemental force element 122 lacks waves 200, the assembly of the belt tensioner 110 does not load the flat first half 198 with a significant bias toward axial expansion. Consequently, the loaded supplemental force element 122 exerts an axial force against the surface 113 of the arm 112, but the exerted axial force is not uniformly applied across the surface 113. Rather, the exerted axial force is concentrated along a half 113a of the surface 113 of the arm 112 that is generally axially aligned with the waved second half 202 of the supplemental force element 122 (see FIG. 2; dashed line Z generally delineates the halves 113a, 113b of surface 113). The supplemental force element 122 does not exert substantial axial forces along half 113b of the arm surface 113, which is generally axially aligned with the flat first half 198 of the supplemental force element 122. Note that because the arm 112 is rotatable relative to the supplemental force element 122, the precise portions of the arm surface 113 which correspond with the halves 113a, 113b vary during the operation of the belt tensioner 110.

Referring now to FIGS. 1, 3, 6, and 7, the belt tensioner 110 automatically controls the tension of the belt 102 by applying a biasing force via the spring 114 in the tensioning direction T against the belt 102. The pulley 128 of the belt tensioner 110 interfaces with the belt 102 and rotates about the second axis B in response to the movement of the belt 102. When a sufficient counterforce is present in the belt 102 to overcome the biasing force of the spring 114, this counterforce urges the pulley 128, and the arm 112 to which it is attached, to rotate about the first axis A in the winding direction W. Once the counterforce is dissipated, the biasing force of the spring 114 again prevails to urge the pulley 128 and the arm 112 back in the tensioning direction T to return the belt tensioner 110 to its position original position.

During this process, the bushing 116 serves as a bearing surface between the arm arbor 136 of the arm 112 and the inner surface 144 of the support member 118. So long as the arm arbor 136 remains aligned relative to the inner portion 144 of the support member 118, the bushing 116 may wear relatively evenly as the arm 112 rotates about axis A during the normal winding and tensioning operations described above. However, a hub load 216 (FIGS. 1, 6, and 7) of the belt 102 against the pulley 128 exerts a force against the arm 112, where the direction of the hub load 216 is the bisection of the entering and exiting angles of the spans of the belt 102. The hub load 216 exerts an additional tilting force against the second end 124 of the arm 112 of the belt tensioner 110 which may overcome any axial forces 218 exerted by the spring 114 that would otherwise maintain axial alignment of the arm arbor 136 of the arm 112 and the inner portion 144 of the support member 118. The hub load 216 may thus tilt or cock the arm arbor 136 out of alignment/balance with the inner portion 144 of the support member 118 (as described, for example, in U.S. Pat. Nos. 4,985,010, 5,334,109, and 6,565,468, each of which are incorporated by reference herein in their entirety). This tilting of the arm arbor 136 in response to the hub load 216 may occur in a specific direction (as indicated by the directional arrow representing the hub load 216), and it may tilt the arm arbor 136 out of alignment with the inner portion 144 of the support member 118 even when the biasing force of the spring 114 maintains the belt tensioner 110 in the normal tensioning position with respect to its winding/unwinding functionality. As a result of the tilt, instead of rotating evenly about Axis A, the axis of rotation deviates slightly and applies increased pressure at a point 220 (FIG. 7) on the bushing 116. Consequently, the bushing 116 will wear more heavily at the point 220, thereby reducing the effective life of the belt tensioner 110.

Figure 7:
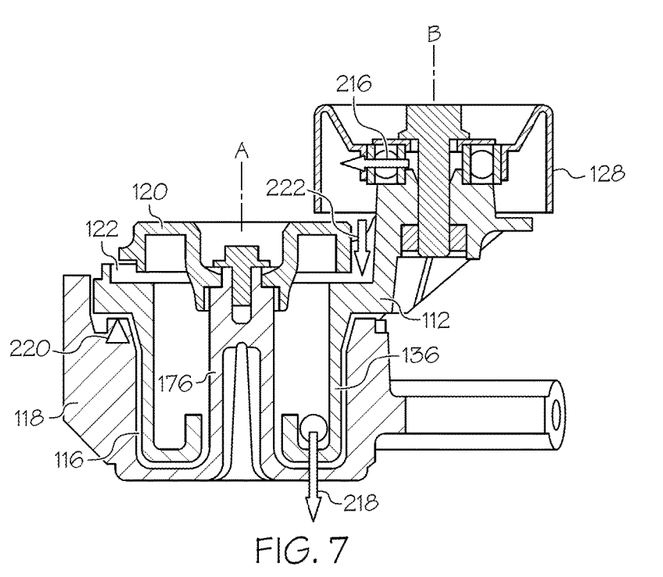
FIG. 7 is a longitudinal cross-sectional view of the tensioner of FIG. 2 showing the hub load and the supplemental force element.

However, the supplemental force element 122 of the instant belt tensioner 110 exerts a supplemental force 222 sufficient to counteract the force of the hub load 216 and prevent tilt, thereby stabilizing the alignment of the arm arbor 136 of the arm 112 relative to the inner portion 144 of the support member 118 to generally prevent increased wear at point 220 by facilitating more consistent contact pressure across the face of the bushing 116. The supplemental force 222 exerted by the supplemental force element 122 also reduces the amount of axial load necessary to be supplied by the spring 114, which yields a more complete distribution of forces to the surfaces of the bushing 116 as compared to a belt tensioner lacking the supplemental force element 122.

The supplemental force 222 is generated in the manner described above via compression of the waves 200 along the waved second half 202 of the supplemental force element 122. In one embodiment (FIG. 6), the supplemental force element 122 is positioned to exert a targeted force 222 in a direction opposite to the direction of the force of the hub load 216 (irrespective of the positioning of any specific component of the tensioner 112). Because the supplemental force 222 exerted by the supplemental force element 122 is concentrated at a predetermined portion of the arm 112 (surface 113a) selected to counteract the hub load 216, the use of the supplemental force element 122 minimizes the generation of forces against portions of the arm 112 where such forces are not required to maintain balance the arm 112 and avoid tilt. Thus, through the targeted application of force, the supplemental force element 122 may not introduce excessive extraneous stresses within the belt tensioner 110 at locations otherwise unaffected by the hub load 216.

When positioning the supplemental force element 122, there are two potential general locations 221, 223 opposite the hub load 216 available to target the supplemental force 222 and counteract the hub load 216. In the embodiment of the belt tensioner 110 shown in FIGS. 2 and 3, the supplemental force element 122 is positioned above (with respect to the depicted orientation) the arm 112 between the cap 120 and the arm 112. In such a configuration, referring now to FIGS. 6 and 7, the waved second half 202 of the supplemental force element 122 should be positioned proximate to location 221 to establish the supplemental force 222 to counteract the hub load 216 by urging the arm 112 toward the support member 118 (i.e. by pressing the arm 112 into the page from above, with reference to the orientation of FIG. 6).

Figure 6:
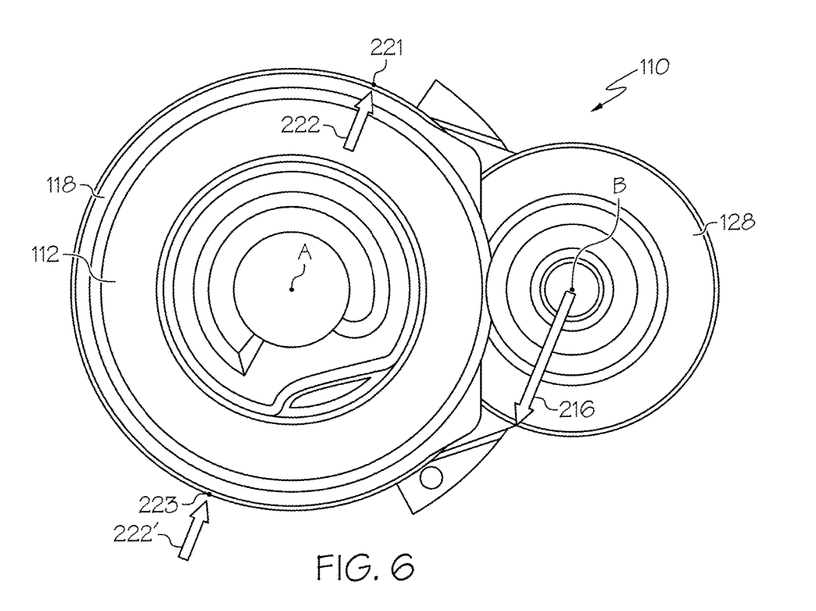
FIG. 6 is a top view of the tensioner of FIG. 2 with force-related annotations thereon.

In another embodiment, the supplemental force element 122 may alternately be positioned between the arm 112 and the support member 118 instead of between the arm 112 and the cap 120, in which case the waved second half 202 of the supplemental force element 122 should be positioned proximate to location 223 to establish an alternate supplemental force 222' to counteract the hub load 216 by urging the arm 112 toward the cap 120 (i.e. by pressing the arm 112 out of the page from below, with reference to the orientation of FIG. 6). Alternately, the belt tensioner 110 may include more than one supplemental force element 122 to apply both supplemental forces 222, 222' to cooperatively counteract the hub load 216.

Figure 8:
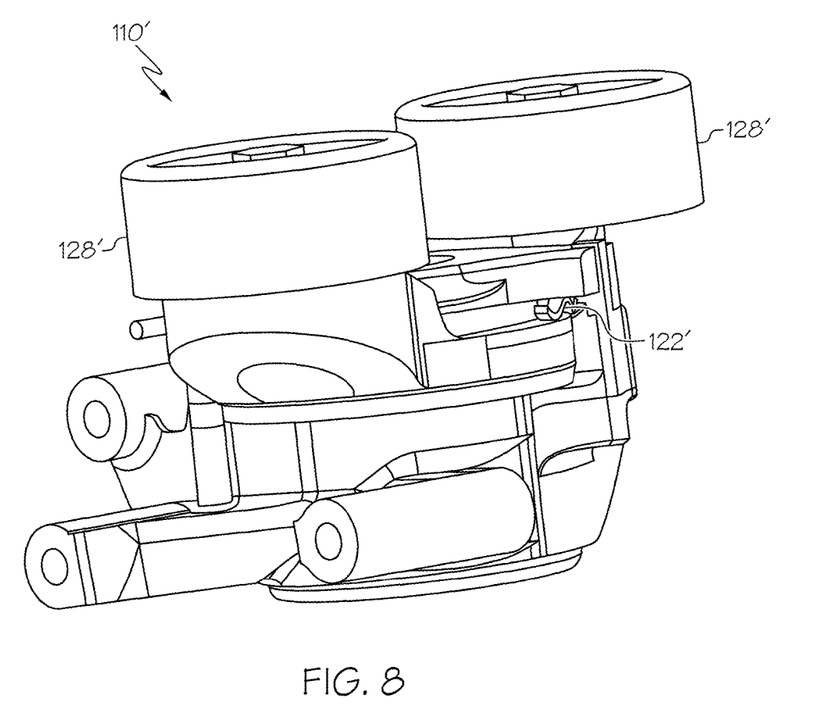
FIG. 8 is a side perspective view of another embodiment of a belt tensioner having a supplemental force element.
Figure 9:
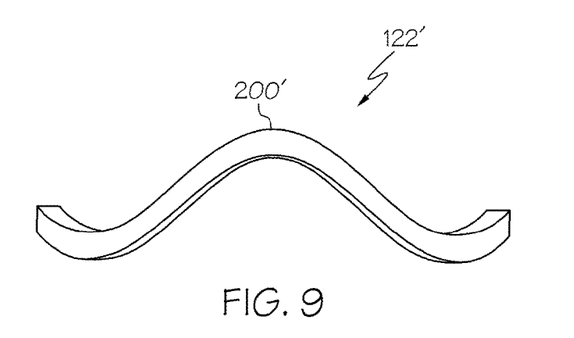
FIG. 9 is a side isometric view of the supplemental force element in the tensioner of FIG. 7.

While the supplemental force element 122 should preferably be positioned to apply the supplemental force 222, 222' at the location(s) opposite the hub load 216, the supplemental force element 122 itself may take any of a wide variety of forms as known in the art to supply the requisite targeted force 222, including, but not limited to, the above-described wave spring embodiment. For example, referring now to FIGS. 8 and 9, the supplemental force element 122' depicted in the belt tensioner 110' is a wave spring segment, with at least one wave 200' therein, that is positioned to apply the supplemental force 222. FIG. 8 depicts an alternate embodiment of the belt tensioner 110' with a dual-arm configuration and a pair of pulleys 128' attached thereto, but the depicted supplemental force element 122' may also be included in single-armed embodiments of the belt tensioner 110. The supplemental force element 122' may be fixedly coupled to the arm 112, the cap 120, or both, as necessary to maintain the supplemental force element 122' in the proper position relative to the hub load to target the supplement force 222 appropriately.

Figure 10:
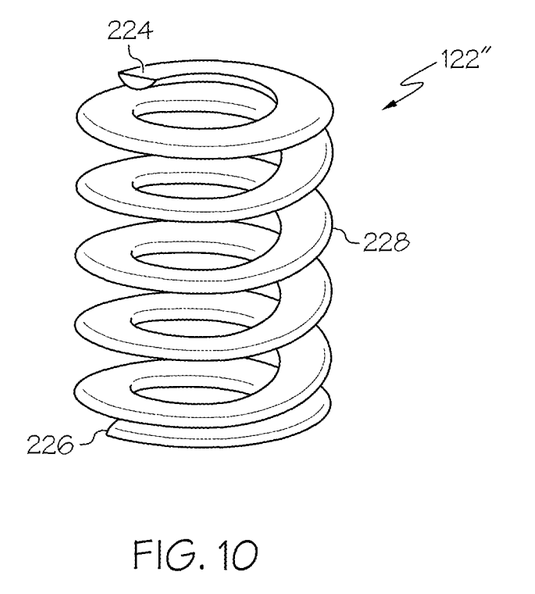
FIG. 10 is another embodiment of a supplemental force element.

Alternately, as shown in FIG. 10, the supplemental force element 122' may be a compression spring such as a die spring with ends 224, 226 and any number of coils 228 therein which may be positioned above or below the arm 112 to provide the supplemental force 222, 222', where the ends 224, 226 may be keyed to other components of the belt tensioner 110 to maintain the proper positioning of the supplemental force element 122".

Figure 11:
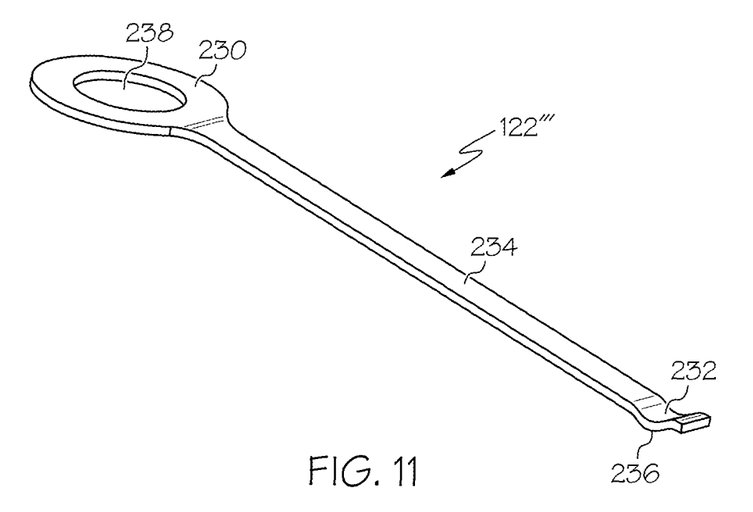
FIG. 11 is an additional embodiment of a supplemental force element.

Further alternately, as seen in FIG. 11, the supplemental force 222 may be exerted by a supplemental force element 122''' that extends radially outward from the first axis A toward the location 221 or 223 (FIG. 6). The supplemental force element 122''' has a first end 230 and a second end 232 with a beam 234 spanning therebetween. The second end 232 may include features such as wave(s) 236 that are positioned between the arm 122 and the cap 120 (or the arm 122 and the support member 118) to bias the arm 122 and provide the supplemental force 222, 222' in a manner similar to the system described above with respect to the supplemental force element 122. Alternately, instead of or in addition to the wave(s) 236, the beam 234 may be loaded to exert a biasing force against the arm 122, which in one embodiment eliminates the need for the second end 232 to interface with the cap 120 or the support member 118 to generate the supplemental force 222. The first end 230 is non-rotatable relative to the cap 120 to maintain proper positioning of the second end 232 relative to the hub load 216 as earlier discussed. The first end 230 may define an opening 236 coaxial with axis A, such that tightening the cap 120 secures the supplemental force element 122''' in position, and/or the cap 190 (or another element of the belt tensioner 110 that is non-rotatable relative to the cap 190) may include features to non-rotatably secure the first end 230 of the supplemental force element 122''' thereto. One skilled in the art will appreciate that other supplemental force element designs may be employed to provide the requisite application of the supplemental force 222.

In addition to the tilting impact of the hub load 216, the winding movement of the belt tensioner 110 itself may have potentially undesirable effects upon the drive system's intended function. To mitigate these undesirable effects, it may be beneficial to have a damper or damping mechanism, for example an asymmetric frictional damper, incorporated into the belt tensioner 110. The damping mechanism resists the movement of the power transmitting element without adversely affecting rotation of the belt tensioner 110, in particular the arm, to tension the power transmitting element.

In addition to the primary asymmetric damping system, the configuration of the cap 120, the supplemental force element 122, the supplemental bushing 148, and the arm 122, as shown in FIGS. 2 and 3, may provide an additional source of damping (though not asymmetric). Because the waves 200 of the waved second half 202 of the supplemental force element 122 are axially compressed, the supplemental force element 122 urges the first end 194 of the supplemental bushing 148 into frictional engagement with the surface 113 of the arm 112 as the arm 112 rotates about first axis A, thus providing a damping effect.

The embodiments of this invention shown in the drawings and described above are exemplary of numerous embodiments that may be made within the scope of the appended claims. It is contemplated that numerous other configurations of the corrugated plate metal structure may be created taking advantage of the disclosed approach. In short, it is the applicant's intention that the scope of the patent issuing herefrom be limited only by the scope of the appended claims.

What is claimed is:

1. A Zed-type belt tensioner comprising:
    an arm having a first end comprising an arm arbor, the arm arbor defining a housing, and having a second end, wherein the first end is rotatable about a first axis to move the second end into engagement with a belt and the second end experiences a hub load during engagement with the belt;
    a cap mated to the arm, the cap comprising an abutment feature;
    a support member having the arm seated therein;
    a primary spring seated in the housing of the arm arbor and having a first end coupled to the arm and a second end coupled to the abutment feature of the cap, the primary spring urging the arm to rotate about the first axis;
    and
    a secondary spring positioned between the arm and the cap or between the arm and the support member;
    wherein the secondary spring applies an axial force non-uniformly across a surface of the arm;
    wherein waves or coils of the secondary spring are only seated against the surface of the arm at a predetermined position that is opposite the hub load of the Zed-type belt tensioner to apply an axial force that counteracts the hub load, in an opposing direction relative to a direction of a force of the hub load, thereby reducing cocking of the arm.

2. The tensioner of claim 1, wherein the secondary spring is an annular wave spring comprising a flat first half and a waved second half with one or more waves therein, wherein the supplemental force is applied by the waved second half.

3. The tensioner of claim 1, wherein the secondary spring is one or more of a wave spring segment comprising at least one wave, a compression spring, a die spring, and a cantilever spring.

4. The tensioner of claim 1, wherein the secondary spring is positioned to apply the supplemental force by urging the arm toward a support member.

5. The tensioner of claim 4, wherein the the cap is non-rotatable about the first axis and comprises a track in which the secondary spring is seated.

6. The tensioner of claim 5, wherein the secondary spring is seated in a bushing positioned between the secondary spring and the arm, and the cap is fixedly coupled to the supplemental bushing.

7. The tensioner of claim 1, wherein the cap is fastened to the support member.

8. A Zed-type belt tensioner comprising:
    an arm having a first end and a second end, wherein the first end is rotatable about a first axis to move the second end into engagement with a belt; wherein the second end experiences a hub load during engagement with the belt;
    a tensioner component coupled to the first end of the arm; and
    a supplemental force element positioned between the arm and the tensioner component to apply a force that counteracts the hub load, thereby reducing cocking of the arm;
    wherein the supplemental force element is an annular wave spring comprising a flat first half and a waved second half with one or more waves therein, wherein the supplemental force is applied by the waved second half.

* * * * *